(12) United States Patent
Zhou et al.

(10) Patent No.: US 11,759,729 B2
(45) Date of Patent: Sep. 19, 2023

(54) DEVICE AND METHOD FOR DEGASSING ON-LOAD TAP-CHANGER OF TRANSFORMER FOR CONVENIENT ON-SITE OPERATION

(71) Applicant: State Grid Liaoning Electric Power Research Institute, Liaoning (CN)

(72) Inventors: Yuxiao Zhou, Liaoning (CN); Lu Liu, Liaoning (CN); Honggang Han, Liaoning (CN); Xuchen Lu, Liaoning (CN); Jianhong Kong, Liaoning (CN); Defu Wei, Liaoning (CN); Tie Guo, Liaoning (CN); Hao Chen, Liaoning (CN); Yang Liu, Liaoning (CN); Nan Wang, Liaoning (CN); Zijian Zhao, Liaoning (CN); Shiqing Wang, Liaoning (CN); Chang Liu, Liaoning (CN); Dawei Jiang, Liaoning (CN); Yue Gao, Liaoning (CN)

(73) Assignee: State Grid Liaoning Electric Power Research Institute, Shenyang (CN)

( * ) Notice: Subject to any disclaimer, the term of this patent is extended or adjusted under 35 U.S.C. 154(b) by 296 days.

(21) Appl. No.: 17/137,426

(22) Filed: Dec. 30, 2020

(65) Prior Publication Data
US 2022/0203266 A1 Jun. 30, 2022

(51) Int. Cl.
| | | |
|---|---|---|
| *B01D 19/00* | (2006.01) | |
| *H01F 29/02* | (2006.01) | |
| *B01D 53/28* | (2006.01) | |
| *B01D 53/26* | (2006.01) | |

(52) U.S. Cl.
CPC ..... *B01D 19/0036* (2013.01); *B01D 19/0073* (2013.01); *B01D 53/261* (2013.01); *B01D 53/28* (2013.01); *H01F 29/02* (2013.01); *B01D 2253/106* (2013.01)

(58) Field of Classification Search
CPC ........ B01D 19/00; B01D 53/26; B01D 53/28; B01D 19/0005; B01D 19/0036; B01D 19/0073; B01D 53/261; B01D 2253/106; B01D 29/50; H01F 29/02; H01F 27/14
See application file for complete search history.

(56) References Cited

FOREIGN PATENT DOCUMENTS

| CN | 205461157 U | * | 8/2016 |
| CN | 109647326 U | * | 4/2019 |

* cited by examiner

*Primary Examiner* — Sharon Pregler

(57) ABSTRACT

A device and method for degassing an on-load tap-changer (OLTC) of a transformer for convenient on-site operation. The degassing device includes an OLTC. The OLTC is respectively connected with an oil suction pipe and an oil injection pipe. One end of the oil suction pipe extends to the inside bottom of the OLTC, and the other end of the oil suction pipe extends to the outside of the OLTC to connect with an oil suction and degassing device. One end of the oil injection pipe extends to an upper part inside the OLTC, and the other end of the oil injection pipe extends to the outside of the OLTC to connect with a vacuum oil injection device. The present disclosure has the advantages of convenient on-site operation, excellent degassing effect, simple structure and convenient installation, reduces degassing time and manpower and investment in maintenance, and improves degassing quality.

5 Claims, 4 Drawing Sheets

DEVICE AND METHOD FOR DEGASSING ON-LOAD TAP-CHANGER OF TRANSFORMER FOR CONVENIENT ON-SITE OPERATION

STATEMENT REGARDING PRIOR DISCLOSURES BY AN INVENTOR OR JOINT INVENTOR

The contents of Chinese Patent Application No. 201910835633.7 filed on Sep. 5, 2019 and published on Mar. 27, 2020, is a grace period disclosure and shall not be prior art to claimed invention.

TECHNICAL FIELD

The present disclosure belongs to the technical field of power transmission and transformation equipment maintenance, and in particular relates to a device and method for degassing an on-load tap-changer (OLTC) of a transformer for convenient on-site operation.

BACKGROUND

In order to meet the high requirements of customers for power quality, the OLTC needs to shift frequently to make the transformer in the correct tap position for operation. During the frequent shift of the OLTC, volatile gases such as hydrogen and acetylene will be generated in the insulating oil in the arc-extinguishing chamber of the OLTC. When the generated gases exceed a certain volume, the non electric quantity protection device of the transformer will be triggered to operate, causing the transformer to exit operation unexpectedly, and in serious cases, endangering the safety of electric power production. At present, it is usually necessary to replace the OLTC or return the OLTC to the manufacturer for repair so as to prevent the problem that the frequent shift of the OLTC leads to a large amount of gases in the arc-extinguishing chamber.

SUMMARY

In order to solve the above-mentioned problem existing in the prior art, the present disclosure provides a device and method for degassing an OLTC of a transformer for convenient on-site operation. The present disclosure features convenient on-site operation, excellent degassing effect and simple structure, reduces the degassing time and manpower and capital investment in maintenance, and effectively improves degassing quality.

To achieve the above objective, the present disclosure adopts the following technical solutions:

A device for degassing an OLTC of a transformer for convenient on-site operation, including an OLTC, where the OLTC is respectively connected with an oil suction pipe and an oil injection pipe; one end of the oil suction pipe extends to the inside bottom of the OLTC, and the other end of the oil suction pipe extends to the outside of the OLTC to connect with an oil suction and degassing device; one end of the oil injection pipe extends to an upper part inside the OLTC, and the other end of the oil injection pipe extends to the outside of the OLTC to connect with a vacuum oil injection device.

The oil suction and degassing device includes a high-purity nitrogen cylinder, a first on-off valve, a first three-way valve, an oil suction pump, an oil storage tank and a first silica gel particle moisture absorber, where a flange at the other end of the oil suction pipe of the OLTC is connected to the first three-way valve; a valve port of the first three-way valve is connected to the high-purity nitrogen cylinder through the first on-off valve via a pipe; another valve port of the first three-way valve is connected to the oil suction pump via a pipe; the other end of the oil suction pump extends into the oil storage tank via a pipe; the oil storage tank is further connected to the first silica gel particle moisture absorber.

A connecting pipe on the first silica gel particle moisture absorber extends into the oil storage tank.

The vacuum oil injection device includes an oil injection tank, a second on-off valve, a vacuum oil injection chamber, a vacuum pressure gauge, a second three-way valve, a second silica gel particle moisture absorber and a vacuum pump; a flange at the other end of the oil injection pipe is connected with the vacuum oil injection chamber via a pipe; the vacuum pressure gauge is connected to the vacuum oil injection chamber; a pipe is connected into the vacuum oil injection chamber, via which the vacuum oil injection chamber is connected to the oil injection tank through the second on-off valve; the vacuum oil injection chamber is connected with the second three-way valve; the second three-way valve is respectively connected to the second silica gel particle moisture absorber and the vacuum pump via a pipe.

A lower extension pipe of the vacuum pressure gauge and an upper extension pipe of the vacuum oil injection chamber are connected by threads.

A pipe is connected into the vacuum oil injection chamber, via which the vacuum oil injection chamber is connected to an oil outlet at the bottom of the oil injection tank through the second on-off valve; the vacuum oil injection chamber is connected with the second three-way valve through a flange on the top thereof.

A valve port of the second three-way valve is connected to a connecting pipe on the second silica gel particle moisture absorber via a pipe; another valve port of the second three-way valve is connected to a vacuum hole on the vacuum pump via a pipe.

A method for degassing an OLTC of a transformer for convenient on-site operation, including: sucking oil from an OLTC of a transformer, injecting nitrogen into the OLTC of the transformer for stirring, and injecting oil into the OLTC of the transformer by vacuuming, where the sucking oil from the OLTC of the transformer includes the following steps: first, closing a first on-off valve, and communicating an oil suction pipe of the OLTC with an oil suction device through a first three-way valve; closing a second on-off valve, and communicating a vacuum oil injection chamber with a second silica gel particle moisture absorber through a second three-way valve; and then starting the oil suction device to suck oil from an oil compartment of the OLTC to an oil storage tank through the oil suction pipe, and enabling a first silica gel particle moisture absorber to work.

The injecting nitrogen into the OLTC of the transformer for stirring includes: first, communicating, by the first three-way valve, the oil suction pipe of the OLTC with a high-purity nitrogen cylinder connected to the first on-off valve; then opening the first on-off valve to inject nitrogen in the nitrogen cylinder through a pipe into the oil compartment of the OLTC to stir insulating oil in the oil compartment of the OLTC, where during stirring, a gas is discharged into the atmosphere through the oil injection pipe, the vacuum oil injection chamber, the second three-way valve and the second silica gel particle moisture absorber; the stirring time is arbitrary within 1-100 min.

The injecting oil into the OLTC of the transformer by vacuuming includes: first, removing an oil suction and degassing device, and sealing a flange at one end of the oil suction pipe; communicating the vacuum oil injection chamber with a vacuum pump through the second three-way valve, and opening the second on-off valve to inject compliant insulating oil in an oil injection tank into the oil compartment of the OLTC, where the amount of injection is basically the same as the amount of suction; closing the second on-off valve after the oil injection is finished, and starting the vacuum pump to vacuum the OLTC; turning off the vacuum pump when a vacuum pressure gauge shows a vacuum pressure satisfying a requirement of the OLTC; and removing the vacuum oil injection device, and sealing the flange at one end of the oil injection pipe.

The present disclosure has the following beneficial effects:

The present disclosure aims to solve the problem of hydrogen, acetylene and other volatile gases generated in the insulating oil in an arc-extinguishing chamber during the frequent shift of the OLTC of the transformer. The present disclosure injects relatively stable and moisture-free high-purity nitrogen into the arc-extinguishing chamber of the OLTC to stir the insulating oil in the arc-extinguishing chamber, so that the hydrogen, acetylene and other gases generated in the insulating oil are quickly released from the insulating oil and discharged to the atmosphere. The present disclosure has the advantages of convenient on-site operation, excellent degassing effect, simple structure and convenient installation, reduces degassing time and manpower and capital investment in maintenance, and significantly improves degassing quality.

During on-site operation, the present disclosure stirs the insulating oil in the arc-extinguishing chamber of the OLTC through the oil suction and degassing device, so that volatile gases such as hydrogen and acetylene in the insulating oil of the arc-extinguishing chamber are discharged to the atmosphere. Meanwhile, the present disclosure ensures that the insulating oil in the arc-extinguishing chamber of the OLTC meets operating regulations through the vacuum oil injection device.

BRIEF DESCRIPTION OF DRAWINGS

In order to facilitate the understanding and implementation of the present disclosure by those of ordinary skill in the art, the present disclosure is described in further detail below with reference to the accompanying drawings and specific implementations. The following implementations are used to illustrate the present disclosure, but it should be understood that the scope of protection of the present disclosure is not limited by the specific implementations.

In FIG. 1: 1. nitrogen cylinder; 2. first on-off valve; 3. first three-way valve; 4. oil suction pump; 5. oil storage tank; 6. first silica gel particle moisture absorber; 7. on-load tap-changer (OLTC); 8. oil suction pipe; 9. oil injection pipe; 10. oil injection tank; 11. second on-off valve; 12. vacuum oil injection chamber; 13. vacuum pressure gauge; 14. second three-way valve; 15. second silica gel particle moisture absorber; and 16. vacuum pump.

DETAILED DESCRIPTION

Figure 1:
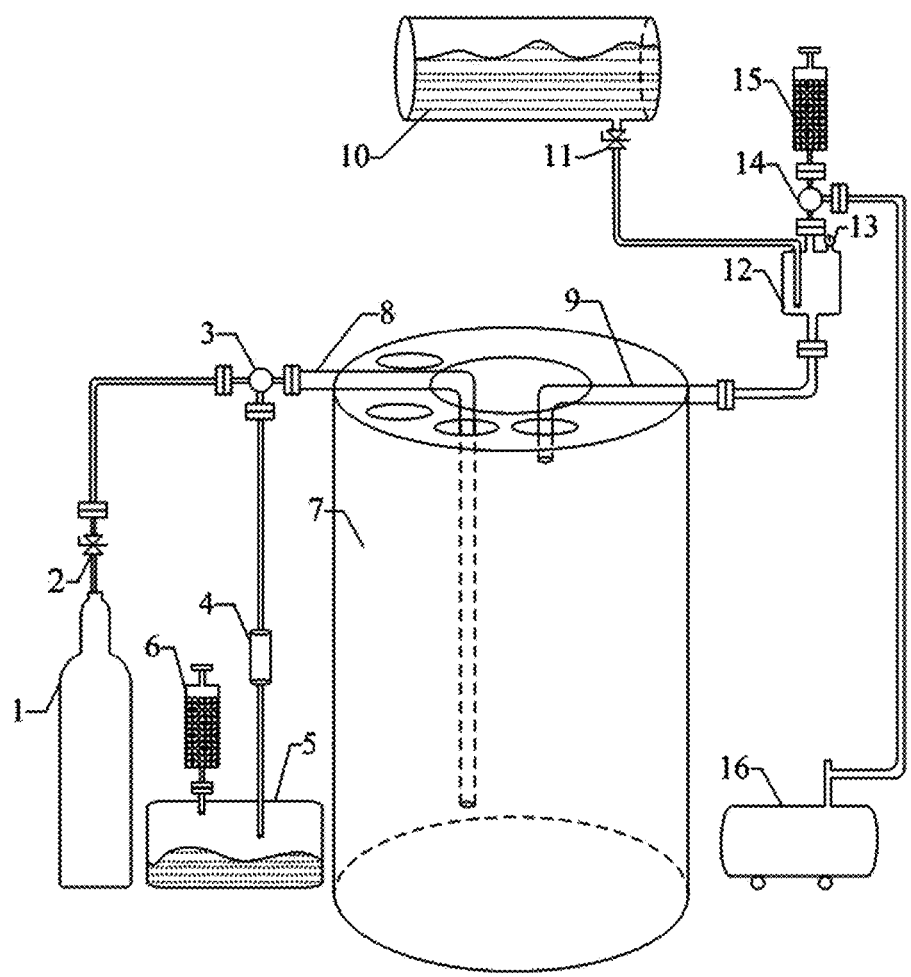
FIG. 1 is a structural diagram of the present disclosure.

As shown in FIG. 1, the present disclosure provides a device for degassing an OLTC of a transformer for convenient on-site operation. The degassing device includes an on-load tap-changer (OLTC) 7. The OLTC 7 is connected with an oil suction pipe 8 and an oil injection pipe 9. The OLTC 7, the oil suction pipe 8 and the oil injection pipe 9 are commercially available products. One end of the oil suction pipe 8 extends to the inside bottom of the OLTC 7, and the other end of the oil suction pipe 8 extends to the outside of the OLTC 7 and is connected with a flange. One end of the oil injection pipe 9 extends to an upper part inside the OLTC 7, and the other end of the oil injection pipe 9 extends to the outside of the OLTC 7 and is connected with a flange. Before the maintenance work of the transformer OLTC starts, an oil suction and degassing device is connected to the other end of the oil suction pipe 8 and a vacuum oil injection device is connected to the other end of the oil injection pipe 9.

The oil suction and degassing device includes a high-purity nitrogen cylinder 1, a first on-off valve 2, a first three-way valve 3, an oil suction pump 4, an oil storage tank 5 and a first silica gel particle moisture absorber 6. The nitrogen cylinder 1, the oil suction pump 4, the oil storage tank 5 and the first silica gel particle moisture absorber 6 are commercially available products. The flange at the other end of the oil suction pipe 8 of the OLTC 7 is connected to the first three-way valve 3. A valve port of the first three-way valve 3 is connected to the high-purity nitrogen cylinder 1 through the first on-off valve 2 via a pipe. Another valve port of the first three-way valve 3 is connected to the oil suction pump 4 via a pipe. The other end of the oil suction pump 4 extends into the oil storage tank 5 via a pipe. The oil storage tank 5 is further connected to the first silica gel particle moisture absorber 6. A connecting pipe on the first silica gel particle moisture absorber 6 extends into the oil storage tank 5.

The vacuum oil injection device includes an oil injection tank 10, a second on-off valve 11, a vacuum oil injection chamber 12, a vacuum pressure gauge 13, a second three-way valve 14, a second silica gel particle moisture absorber 15 and a vacuum pump 16. The oil injection tank 10, the vacuum oil injection chamber 12, the second silica gel particle moisture absorber 15 and the vacuum pump 16 are commercially available products. A flange at the other end of the oil injection pipe 9 on the OLTC 7 is connected with the vacuum oil injection chamber 12 via a pipe. The vacuum pressure gauge 13 is connected to the vacuum oil injection chamber 12. Specifically, a lower extension pipe of the vacuum pressure gauge 13 and an upper extension pipe of the vacuum oil injection chamber 12 are connected by threads. A pipe is connected into the vacuum oil injection chamber 12, via which the vacuum oil injection chamber is connected to an oil outlet at the bottom of the oil injection tank 10 through the second on-off valve 11. The vacuum oil injection chamber 12 is connected with the second three-way valve 14 through a flange on the top thereof. A valve port of the second three-way valve 14 is connected to a connecting pipe on the second silica gel particle moisture absorber 15 via a pipe. Another valve port of the second three-way valve 14 is connected to a vacuum hole on the vacuum pump 16 via a pipe.

The present disclosure provides a method for degassing an OLTC of a transformer for convenient on-site operation. The degassing method includes: suck oil from an OLTC of a transformer, inject nitrogen into the OLTC of the transformer for stirring, and inject oil into the OLTC of the transformer by vacuuming.

Figure 2:
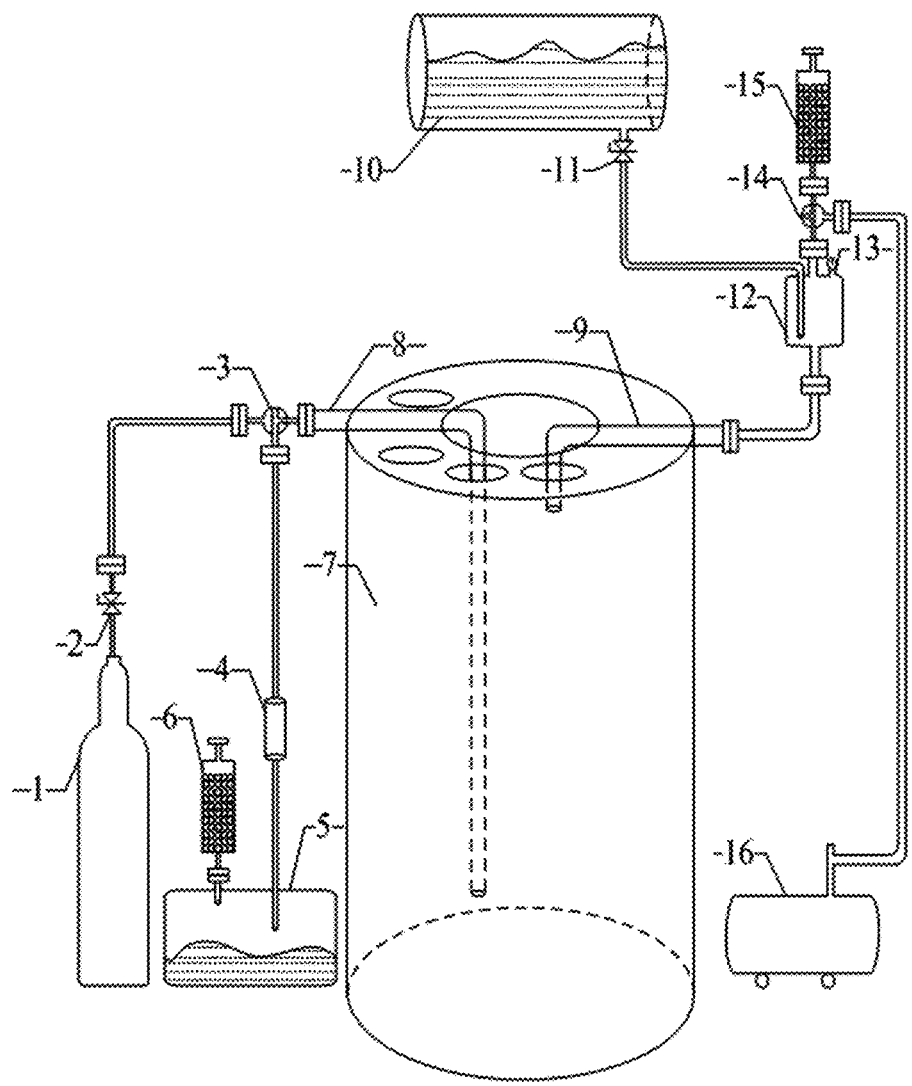
FIG. 2 is a schematic diagram of sucking oil from an on-load tap-changer (OLTC) of a transformer according to the present disclosure.

FIG. 2 is a schematic diagram of sucking oil from the OLTC of the transformer according to the present disclosure. As shown in FIG. 2, the sucking oil from the OLTC of the transformer includes the following steps: first, close a first on-off valve 2, and communicate an oil suction pipe 8 of the OLTC 7 with an oil suction device 4 through a first three-way valve 3; close a second on-off valve 11, and communicate a vacuum oil injection chamber 12 with a second silica gel particle moisture absorber 15 through a second three-way valve 14; and then start the oil suction device 4 to suck a certain amount of oil from an oil compartment of the OLTC 7 to an oil storage tank 5 through the oil suction pipe 8, and enable a first silica gel particle moisture absorber 6 to prevent moisture in the air from entering into the oil storage tank 5 to damp and deteriorate the oil in the oil storage tank 5.

Figure 3:
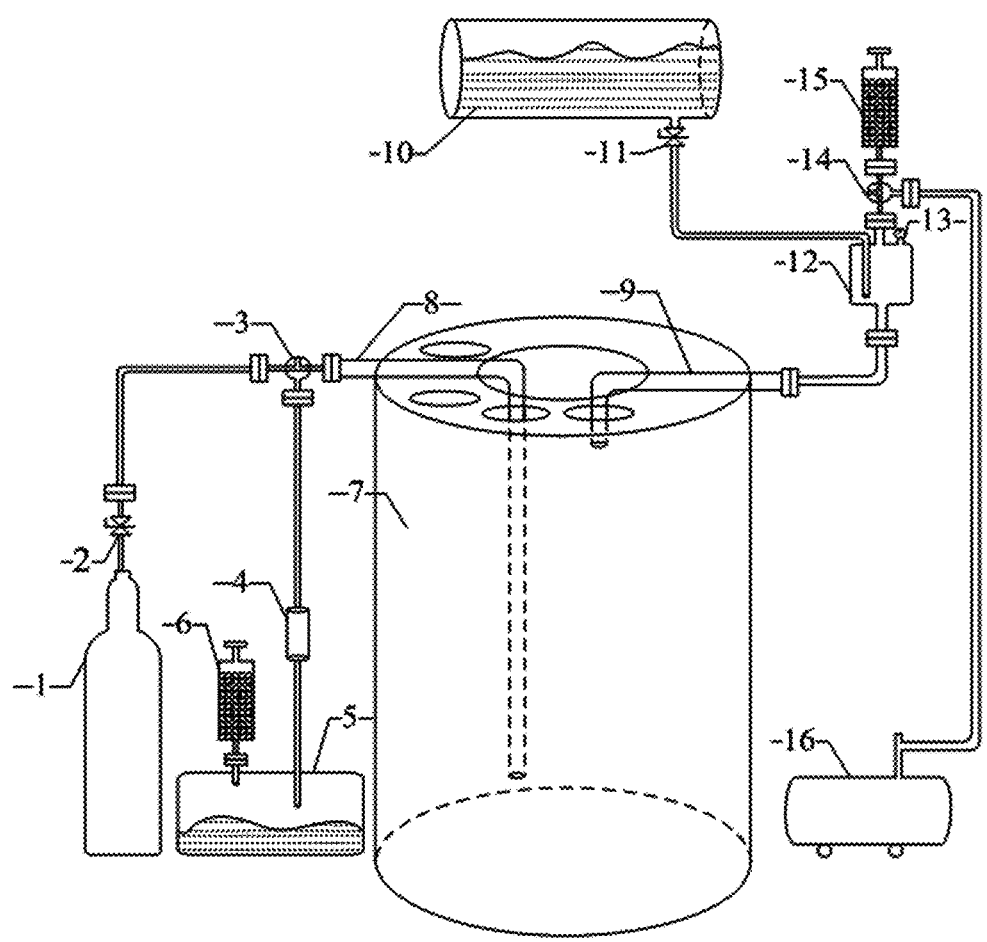
FIG. 3 is a schematic diagram of injecting nitrogen into the OLTC of the transformer for stirring according to the present disclosure.

FIG. 3 is a schematic diagram of injecting nitrogen into the OLTC of the transformer for stirring according to the present disclosure. As shown in FIG. 3, the injecting nitrogen into the OLTC of the transformer for stirring includes: first, communicate, by the first three-way valve 3, the oil suction pipe 8 of the OLTC 7 with a high-purity nitrogen cylinder 1 connected to the first on-off valve 2; then open the first on-off valve 2 to inject nitrogen in the nitrogen cylinder 1 through a pipe into the oil compartment of the OLTC 7 to stir insulating oil in the oil compartment of the OLTC 7 for 30 min. During stirring, a gas is discharged into the atmosphere through an oil injection pipe 9, a vacuum oil injection chamber 12, a second three-way valve 14 and a second silica gel particle moisture absorber 15. The second silica gel particle moisture absorber 15 can prevent the insulating oil in the oil compartment of the OLTC 7 from being damped. The time for stirring the insulating oil in the oil compartment of the OLTC 7 is arbitrary within 1-100 min.

Figure 4:
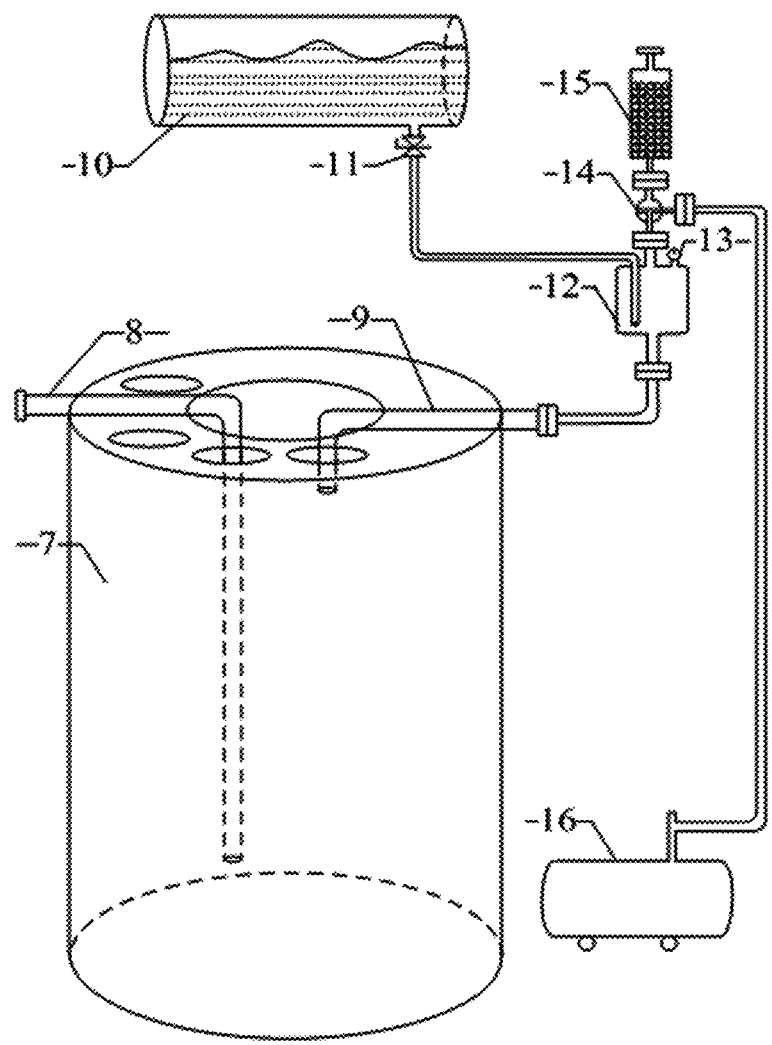
FIG. 4 is a schematic diagram of injecting oil into the OLTC of the transformer by vacuuming according to the present disclosure.

FIG. 4 is a schematic diagram of injecting oil into the OLTC of the transformer by vacuuming according to the present disclosure. As shown in FIG. 4, the injecting oil into the OLTC of the transformer by vacuuming includes: first, remove an oil suction and degassing device, and seal a flange at one end of the oil suction pipe 8; communicate the vacuum oil injection chamber 12 with a vacuum pump 16 through the second three-way valve 14, and open the second on-off valve 11 to inject compliant insulating oil in an oil injection tank 10 into the oil compartment of the OLTC 7, where the amount of injection is basically the same as the amount of suction; close the second on-off valve 11 after the oil injection is finished, and start the vacuum pump 16 to vacuum the OLTC 7; turn off the vacuum pump 16 when a vacuum pressure gauge 13 shows a vacuum pressure satisfying a requirement of the OLTC 7; and remove the vacuum oil injection device, and seal the flange at one end of the oil injection pipe 9. Thus, the on-site degassing operation of the OLTC of the transformer is over.

The present disclosure stirs the insulating oil in the arc-extinguishing chamber of the OLTC through the oil suction and degassing device, so that volatile gases such as hydrogen and acetylene in the insulating oil of the arc-extinguishing chamber are discharged to the atmosphere. Meanwhile, the present disclosure ensures that the insulating oil in the arc-extinguishing chamber of the OLTC meets the operating regulations through the vacuum oil injection device. The present disclosure reduces degassing time and manpower and capital investment in maintenance, and improves degassing quality.

The above-mentioned specific implementations are preferred implementations of the present disclosure, and may not be construed as a limitation to the present disclosure. The specific implementations of the present disclosure may be determined according to the technical solutions and actual conditions of the present disclosure. Any other modifications or equivalent replacements made without departing from the technical solution of the present disclosure should all be included in the protection scope of the present disclosure.

What is claimed is:

1. A device for degassing an on-load tap-changer (OLTC) of a transformer for convenient on-site operation, comprising:
   an OLTC, comprising an oil suction pipe and an oil injection pipe;
   wherein a first end of the oil suction pipe extends to the inside bottom of the OLTC and a second other end of the oil suction pipe extends to the outside of the OLTC to connect with an oil suction and degassing device; and
   wherein a first end of the oil injection pipe extends to an upper part inside the OLTC and a second end of the oil injection pipe extends to the outside of the OLTC to connect with a vacuum oil injection device;
   wherein the oil suction and degassing device comprises a high-purity nitrogen cylinder, a first on-off valve, a first three-way valve, an oil suction pump, an oil storage tank and a first silica gel particle moisture absorber;
   wherein a flange at the second end of the oil suction pipe of the OLTC is connected to the first three-way valve; a valve port of the first three-way valve is connected to the high-purity nitrogen cylinder through the first on-off valve via a pipe;
   wherein another valve port of the first three-way valve is connected to the oil suction pump via a pipe;
   wherein the second end of the oil suction pump extends into the oil storage tank via a pipe; and
   wherein the oil storage tank is further connected to the first silica gel particle moisture absorber;
   wherein the vacuum oil injection device comprises
   an oil injection tank,
   a vacuum pressure gauge connected to the vacuum oil injection chamber;
   a second silica gel particle moisture absorber and a vacuum pump;
   a flange connected at the second end of the oil injection pipe in communication with the vacuum oil injection chamber, the vacuum oil injection chamber is connected to the oil injection tank through the second on-off valve;
   a pipe connected to the vacuum oil injection chamber, and
   a vacuum oil injection chamber connected with a second three-way valve that is respectively connected to the second silica gel particle moisture absorber and the vacuum pump.

2. The device for degassing an OLTC of a transformer for convenient on-site operation according to claim 1, wherein a connecting pipe on the first silica gel particle moisture absorber extends into the oil storage tank.

3. The device for degassing an OLTC of a transformer for convenient on-site operation according to claim 1, wherein a lower extension pipe of the vacuum pressure gauge and an upper extension pipe of the vacuum oil injection chamber are connected by threads.

4. The device for degassing an OLTC of a transformer for convenient on-site operation according to claim 1, wherein a pipe is connected into the vacuum oil injection chamber, via which the vacuum oil injection chamber is connected to an oil outlet at the bottom of the oil injection tank through the second on-off valve; the vacuum oil injection chamber is connected with the second three-way valve through a flange on the top thereof.

5. The device for degassing an OLTC of a transformer for convenient on-site operation according to claim 1, wherein a valve port of the second three-way valve is connected to a connecting pipe on the second silica gel particle moisture absorber via a pipe; another valve port of the second three-way valve is connected to a vacuum hole on the vacuum pump via a pipe.

\* \* \* \* \*